(No Model.)
E. B. MANNING & M. SEIPS.
HANDLE FOR TEA OR COFFEE POTS.
No. 599,986.          Patented Mar. 1, 1898.
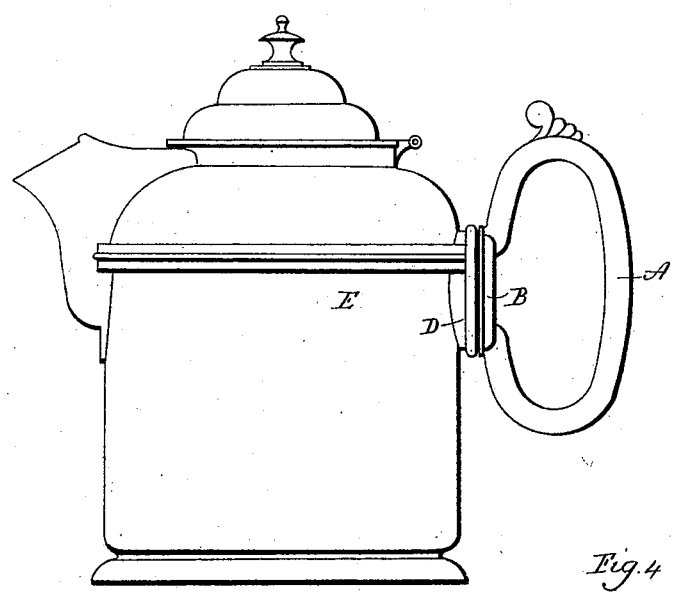
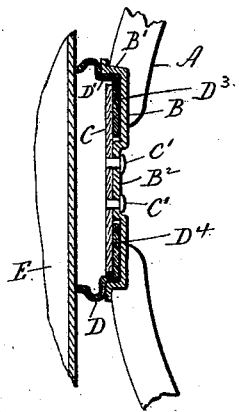
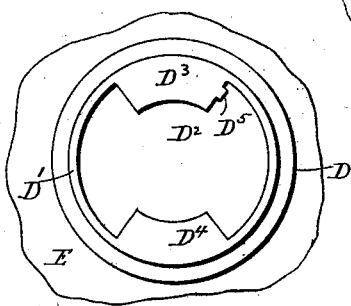
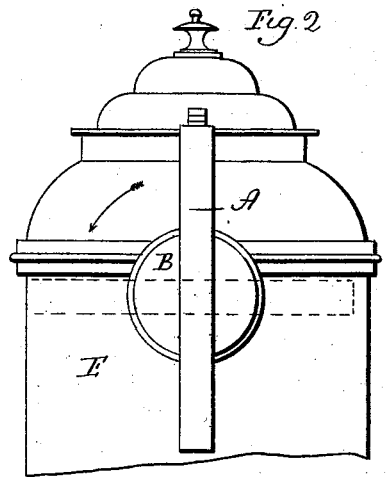
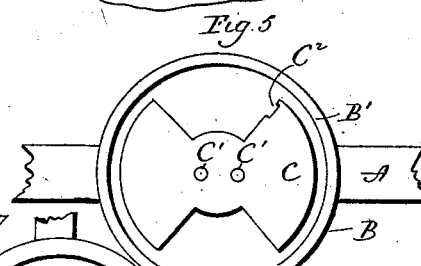
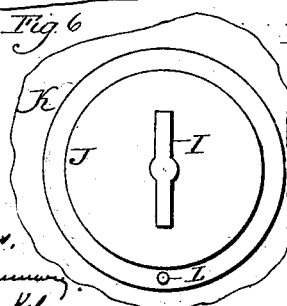
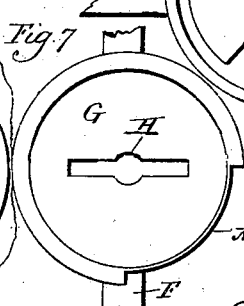

UNITED STATES PATENT OFFICE.

EDWARD B. MANNING AND MICHAEL SEIPS, OF MERIDEN, CONNECTICUT.

HANDLE FOR TEA OR COFFEE POTS.

SPECIFICATION forming part of Letters Patent No. 599,986, dated March 1, 1898.

Application filed October 18, 1897. Serial No. 655,499. (No model.)

*To all whom it may concern:*

Be it known that we, EDWARD B. MANNING and MICHAEL SEIPS, of Meriden, in the county of New Haven and State of Connecticut, have invented a new Improvement in Handles for Tea or Coffee Pots; and we do hereby declare the following, when taken in connection with the accompanying drawings and the letters of reference marked thereon, to be a full, clear, and exact description of the same, and which said drawings constitute part of this specification, and represent, in—

Figure 1, a view in side elevation of a pot provided with one form which our improved removable handle may assume; Fig. 2, a broken view of the pot in rear elevation; Fig. 3, a broken view, in vertical section, through the coupling members of the handle and pot; Fig. 4, a broken view, in rear elevation, of the coupling member of the pot; Fig. 5, a broken view, in inside elevation, of the coupling member of the handle; Figs. 6 and 7, corresponding views of one of the modified forms which our improvement may assume.

Our invention relates to an improvement in detachable handles for tea and coffee pots and the like, the object being to produce at a low cost for manufacture a simple, durable, and effective handle constructed with particular reference to ease of application to and removal from the pot.

With these ends in view our invention consists in a handle having certain details of construction and combinations of parts, as will be hereinafter described, and pointed out in the claims.

In carrying out our invention as herein shown we employ a handle A which is oval in general form and the distinguishing feature of which is that its upper end is curved downward and its lower end is curved upward for the permanent attachment of both of the said ends to a coupling member B, which in the construction shown consists of a circular sheet-metal plate B, having an annular inwardly-projecting flange B' formed upon its edge. The central portion of this plate is struck inwardly to form a raised hub $B^2$ for supporting in an elevated position above the inner face of the plate a coupling-piece in the form of a double-ended coupling-lug C, which is rigidly secured to the hub by means of rivets C' C', as shown in Fig. 3, so as to coincide with the plane of the handle. The said lug may therefore be said to be vertically arranged. For coaction with the said flanged plate and double-ended coupling-lug we provide the pot with a fixed coupling member D, consisting of a hollow circular sheet-metal boss, which is rigidly secured by its edge to the body E of the pot, the said boss being formed with an annular shoulder D', over which the annular flange B' of the flanged plate B fits, and with a horizontally-arranged double-ended coupling-slot $D^2$, which receives the double-ended coupling-lug C. The formation of the said slot results in the production of two vertically-arranged coupling-flanges $D^3$ $D^4$, with which the ends of the coupling-lug are interlocked when the handle is in its home position. The said coupling-flange $D^3$ is formed with an integral stop-finger $D^5$, which limits the rotary movement of the coupling-lug C within the boss D, the upper end of the said coupling-lug C being formed with a notch $C^2$ for the reception of the said stop-finger $D^5$.

In applying our improved detachable handle when constructed as above described the hand is passed through it and it is turned into a horizontal plane for the registration of its double-ended coupling-lug with the horizontally-arranged double-ended coupling-slot formed in the boss secured to the pot. The said lug and slot having been registered, the handle is moved inward, so as to cause the lug to enter the slot, the annular flange B' of the plate B being at the same time caused to engage with the annular shoulder D' of the boss D. The handle is then turned from left to right for a quarter-turn, so as to bring it into vertical position, the free ends of the coupling-lug being thus moved under and engaged with the vertically-arranged coupling-flanges $D^3$ and $D^4$ of the boss D, whereby the handle is positively coupled with the pot. The handle is prevented from being turned too far by the stop-finger $D^5$, formed integral with the farther edge of the upper flange $D^3$, the said finger entering the notch formed in the farther edge of the upper end of the lug C. When it is desired to detach the handle from the pot, the handle is turned from right to left for a quarter-turn, so as to disengage the ends of the coupling-lug C from the flanges D³ D⁴ and bring the said lug into registration with the coupling-slot D², after which the handle may be drawn away from the pot. The engagement of the annular flange of the flanged plate with the annular shoulder of the boss renders the connection between the handle and pot more stable and relieves the strain upon the double-ended coupling-lug employed to positively connect them.

It will be seen from the foregoing that our improved construction is extremely simple and not only perfectly effective but very convenient.

It will also be seen that our improved device is made exceptionally convenient by the fact that there is virtually but one point of attachment between the handle and the pot, this being made possible by permanently securing the ends of the handle to a single plate. We may remark in this connection that, if desired, the construction shown and described may be reversed and the double-ended coupling-lug connected with the pot and the double-ended coupling-slot located in the inner face of the plate to which the ends of the handle are connected.

In the modified construction shown by Figs. 5 and 6 the ends of the handle F are attached to a flanged plate G, provided with a double-ended coupling-key H, adapted to be inserted into a double-ended key-slot I, formed in a hollow circular boss J, secured to the body of the pot K. The said boss J is furnished with a stop-pin L, which coacts with the ends of a slot M, formed in the plate, for limiting the rotation of the handle beyond a quarter-turn. It will be readily understood that the operation of the device shown by Figs. 5 and 6 is substantially the same as that of the device shown in the preceding figures.

In view of the modification shown and described and of others which may obviously be made we would have it understood that we do not limit ourselves to the exact construction herein shown, but hold ourselves at liberty to make such changes and alterations as fairly fall within the spirit and scope of our invention.

Having fully described our invention, what we claim as new, and desire to secure by Letters Patent, is—

1. In a tea or coffee pot, the combination with a handle, of a circular plate having an inwardly-projecting flange formed upon its edge, and the ends of the handle permanently secured to it, a circular boss located upon the body of the pot and formed with an annular shoulder for coaction with the flange of the said plate, and coupling means located within the flange of the plate and within the periphery of the boss for positively coupling the two together when the plate is rotated, the bearing of the flange of the plate upon the periphery of the boss serving to take a portion of the strain from the coupling means and to make the joint thus formed more stable.

2. In a tea or coffee pot, the combination with a handle, of a circular plate having an inwardly-projecting flange formed upon its edge, and having the ends of the handle permanently secured to it, a double-ended coupling-lug centrally secured to the inner face of the said plate, and a hollow circular boss located upon the body of the pot, and formed with an annular shoulder for coaction with the flange of the said plate and with a horizontally-arranged, doubled-ended coupling-slot which receives the said double-ended coupling-lug and permits its entrance into the said boss with which it is then engaged by turning the handle.

In testimony whereof we have signed this specification in the presence of two subscribing witnesses.

EDWARD B. MANNING.
MICHAEL SEIPS.

Witnesses:
E. J. POOLEY,
GEO. R. DIMOCK.